US007835523B1

(12) United States Patent
Mickelson et al.

(10) Patent No.: US 7,835,523 B1
(45) Date of Patent: Nov. 16, 2010

(54) CRYPTOGRAPHIC ENGINE ABSTRACTION LAYER FOR A SOFTWARE DEFINED RADIO

(75) Inventors: Rodney L. Mickelson, Cedar Rapids, IA (US); Dipak P. Patel, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1449 days.

(21) Appl. No.: 11/213,399

(22) Filed: Aug. 26, 2005

(51) Int. Cl.
*G06F 12/14* (2006.01)
*H04K 1/00* (2006.01)
*H04L 9/00* (2006.01)

(52) U.S. Cl. ......................... 380/255; 380/28; 713/189; 713/190; 713/191

(58) Field of Classification Search ....................... None
See application file for complete search history.

(56) References Cited

U.S. PATENT DOCUMENTS

| | | | | |
|---|---|---|---|---|
| 4,757,536 | A | 7/1988 | Szczutkowski et al. | 380/48 |
| 4,856,061 | A | 8/1989 | Thrane | 380/48 |
| 5,222,140 | A | 6/1993 | Beller et al. | 380/30 |
| 5,481,610 | A | 1/1996 | Doiron et al. | 380/21 |
| 5,483,595 | A | 1/1996 | Owen | 380/23 |
| 5,889,861 | A | 3/1999 | Ohashi et al. | 380/21 |
| 6,043,752 | A | 3/2000 | Hisada et al. | 340/825.31 |
| 6,886,095 | B1 | 4/2005 | Hind et al. | 713/168 |
| 2006/0059537 | A1 * | 3/2006 | Alvermann et al. | 726/1 |

* cited by examiner

*Primary Examiner*—Kaveh Abrishamkar
(74) *Attorney, Agent, or Firm*—Matthew J. Evans; Daniel M. Barbieri

(57) ABSTRACT

A radio system comprises radio frequency receiving electronics and digital signal processing electronics coupled to the radio frequency receiving electronics. The radio system is characterized by security electronics coupled to the digital signal processing electronics. The security electronics comprise a cryptographic subsystem. The cryptographic subsystem comprises cryptographic equipment software, core cryptographic algorithms and a cryptographic engine abstraction layer hardware each of which is stacked with but separate from one another. The cryptographic engine abstraction layer hardware has been designed for the specific radio system design.

20 Claims, 3 Drawing Sheets

CRYPTOGRAPHIC ENGINE ABSTRACTION LAYER FOR A SOFTWARE DEFINED RADIO

BACKGROUND OF THE INVENTION

Conventional modern communication and some conventional modern navigation systems employ at least some form of information security and, hence often require cryptography. A conventional transceiver system for a radio may comprise numerous processing subsystems for each channel. For example, a transceiver unit may contain a digital signal processing subsystem, a black processing subsystem, a cryptographic subsystem, a red processing subsystem, etc. for each channel. In military communication systems and selected commercial communication systems the cryptography system and method employed are often computationally complex. Furthermore, recent mandates from the National Security Agency (NSA) and the Department of Defense (DOD) require cryptography implementations to be programmable so that algorithms can be switched and updated. International military customers may wish to create and implement their own unique or "country-specific" cryptography algorithms.

To date, computationally complex and programmable cryptography has been implemented using "programmable crypto engines" that are sometimes hardware and sometimes software programmable. In either case, the implementation of a given algorithm requires detailed technical knowledge of the engine architecture and instruction set. For crypto engines that provide multi-level security (MLS) or multiple single levels of security (MSLS), the implementation expertise and domain knowledge requirements are even greater. This required expertise precludes many international customers from implementing their own unique or "country-specific" algorithms. The proprietary nature of some of these cryptographic engines also makes it difficult for one company or customer to implement new algorithms without the consent of likely unwilling corporate competitors.

Even if one were to overcome the domain knowledge issue, once the algorithms are implemented, they are not portable to other cryptographic engines. The unportability of the crypto engines is due to the architectures of the engines on the market today (e.g. Harris Sierra I and II, GD AIM Engine, and Raytheon Cornfield) and those under development (such as NRL PEIP II and Rockwell Collins Janus), have almost completely different architectures. The constituent elements, e.g., processors, FPGAs, memory devices, etc., are also almost always different.

What is needed, therefore, is a system and a method that overcomes one or more of the deficiencies described above. What is needed is an approach that "abstracts away" the specifics of the hardware architecture must be used, so that the primary algorithm software can be easily rehosted on any cryptographic engine that employs such abstraction. No such approach has been developed and applied to cryptographic engines.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

What is provided is a radio system. The radio system comprises radio frequency receiving electronics and digital signal processing electronics coupled to the radio frequency receiving electronics. The radio system also comprises security electronics coupled to the digital signal processing electronics. The security electronics comprise a cryptographic subsystem. The cryptographic subsystem comprises cryptographic equipment software, core cryptographic algorithms and a cryptographic engine abstraction layer hardware each of which is stacked with but separate from one another, the cryptographic engine abstraction layer hardware having been designed for the specific radio system design.

What is also provided is a method of providing radio communications. The method comprises providing radio frequency communications to radio frequency receiving electronics and processing a received signal by digital signal processing electronics coupled to the radio frequency receiving electronics. The method also comprises decrypting received signals by using security electronics coupled to the digital signal processing electronics. The security electronics comprise a cryptographic subsystem, the cryptographic subsystem comprises cryptographic equipment software, core cryptographic algorithms and a cryptographic engine abstraction layer hardware each of which is stacked with but separate from one another, the cryptographic engine abstraction layer hardware having been designed for the specific radio system design.

Further what is provided is an apparatus for providing radio communications. The apparatus comprises a means for providing radio frequency communications to radio frequency receiving electronics and a means for processing a received signal by digital signal processing electronics coupled to the radio frequency receiving electronics. The apparatus also comprises a means for decrypting received signals by using security electronics coupled to the digital signal processing electronics. The security electronics comprise a cryptographic subsystem, the cryptographic subsystem comprises cryptographic equipment software, core cryptographic algorithms and a cryptographic engine abstraction layer hardware each of which is stacked with but separate from one another, the cryptographic engine abstraction layer hardware having been designed for the specific radio system design.

Other principal features and advantages of the invention will become apparent to those skilled in the art upon review of the following drawings, the detailed description, and the appended claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
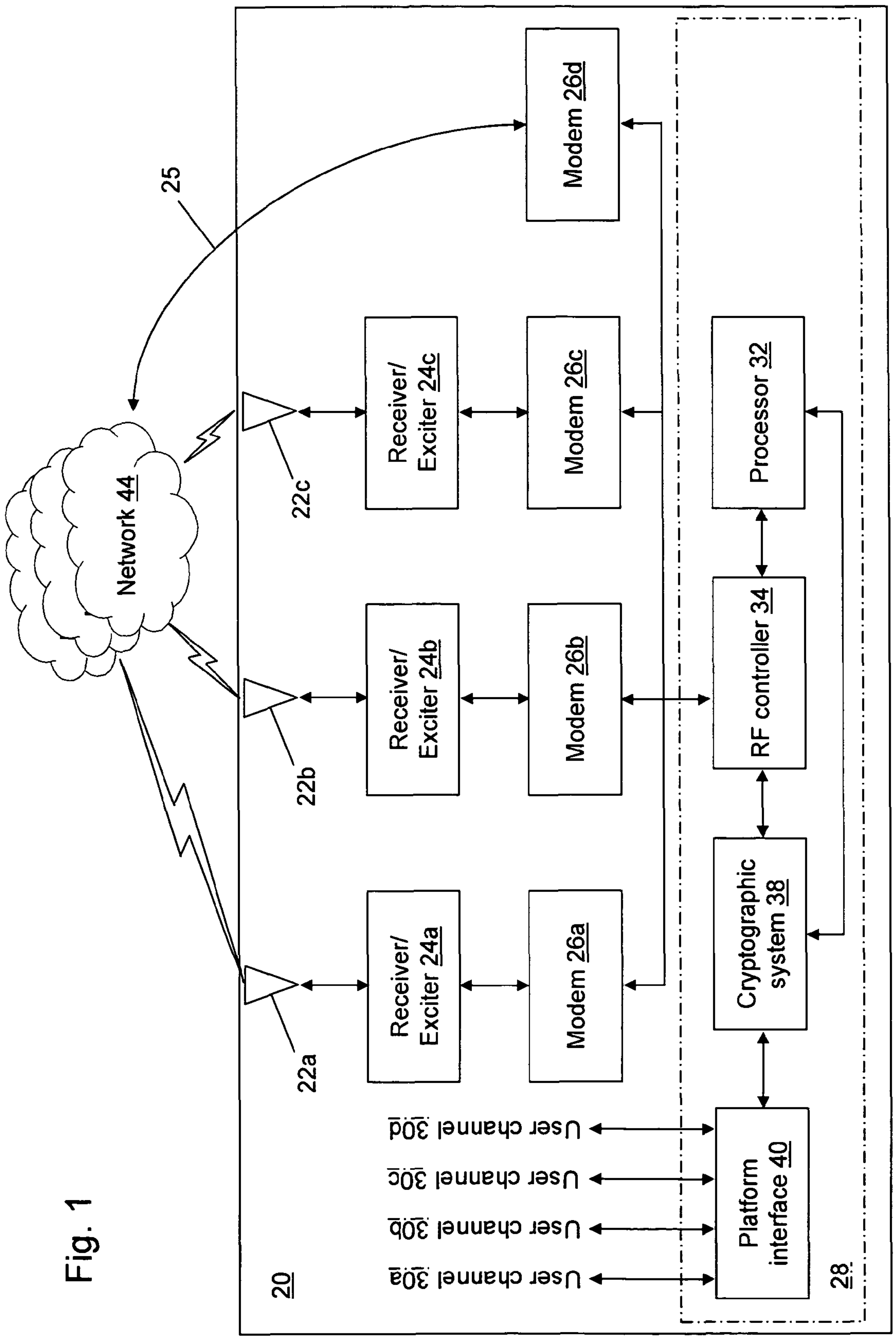
FIG. 1 is a block diagram of an exemplary device utilizing a cryptographic system in accordance with an exemplary embodiment of the present invention.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, a device 20 in accordance with an exemplary embodiment is shown. In the exemplary embodiment, device 20 includes, but is not limited to, a plurality of transceiver antennas 22*a*-22*c*, a receiver/exciter 24 for each of the plurality of transceiver antennas 22*a*-22*c*, a modem 26 for each of the plurality of transceiver antennas 22*a*-22*c*, a modem 26*d*, a networking/information security (INFOSEC) functional unit (NIU) 28, and a plurality of user channels 30*a*-30*d*. The device 20 need not be a communication device. For example, the device 20 may be a computer of any form factor. In the exemplary embodiment, device 20 may provide communication capabilities across the entire communication spectrum or across only a portion of the spectrum. In operation, a wireless communication signal is received by one of the plurality of transceiver antennas 22*a*-22*c* and processed through the corresponding receiver/exciter 24*a*-24*c* whereby the received signal is filtered from a transmission radio frequency (RF) to an intermediate frequency (IF) and possibly converted from an analog signal to a digital signal. The processed signal is demodulated by the respective modem 26*a*-26*d* before processing through NIU 28 and sending onto the appropriate user channel 30*a*-30*d*. Similarly, in a reverse procedure, data from one of the plurality of user channels 30*a*-30*d* is received by NIU 28, is modulated by one of the modems 26*a*-26*c*, and is sent to a corresponding receiver/exciter 24*a*-24*c* for transmission by one of the transceiver antennas 22*a*-22*c* over network 44.

Devices in a network are connected by communication paths that may be wired or wireless. Device 20 may connect with a plurality of networks 44. Device 20 includes a wired connection 25 that connects to modem 26*d*. The plurality of networks 44 may include both wired and wireless devices, such as satellites, cellular antennas, radios, etc. Thus, device 20 may communicate with other devices through both wired and wireless connections. The plurality of networks 44 additionally may interconnect with other networks and contain sub-networks. A network can be characterized by the type of transmission technology used. Device 20 may support communication using transmission technologies known by those skilled in the art both now and in the future.

In an alternative embodiment, device 20 may include separate transmit and receive antennas. Also, as known to those skilled in the art, a modem can process signals from more than one receiver/exciter 24*a*-24*c* and/or more than one wired connection. As a result, there may be fewer or additional modems 26*a*-26*d*. Additional components may be utilized by communication device 20. For example, device 20 includes one or more power source that may be a battery. Additionally, device 20 may include power amplifiers, filters, and other RF devices, for example, to perform antenna switching and/or cosite mitigation.

NIU 28 provides a host of functions that configure and control the flow of radio traffic between the modems 26*a*-26*d* and the user channels 30*a*-30*d*. The user channels 30*a*-30*d* may support red applications and/or black applications. A red application utilizes security controlled information such as the received signal or other information accessible by communication device 20; whereas black applications do not utilize security controlled information. NIU 28 also enforces a security policy associated with the flow of information between the modems 26*a*-26*d* and the user channels 30*a*-30*d*. In an exemplary embodiment, NIU 28 includes, but is not limited to, a processor 32, an RF controller 34, a cryptographic system 38, and a platform interface 40.

Processor 32 executes instructions that may be written using one or more programming language, scripting language, assembly language, etc. The instructions may be carried out by a special purpose computer, logic circuits, or hardware circuits. Thus, processor 32 may be implemented in hardware, firmware, software, or any combination of these methods. The term "execution" is the process of running an application or the carrying out of the operation called for by an instruction. Device 20 may have one or more processor 32 that use the same or a different processing technology to execute instructions.

RF controller 34 controls the flow of information between the plurality of modems 26*a*-26*d* and the plurality of user channels 30*a*-30*d* and maintains the MILS. RF controller 34 may be implemented in hardware, firmware, software, or any combination of these methods. Cryptographic system 38 implements cryptographic functions associated with encryption/decryption of input data received from one of the user channels 30*a*-30*d* or received from one of the modems 26*a*-26*d*. Platform interface 40 provides the interface with the user channels 30*a*-30*d*.

In general, cryptography is used to protect data while it is being communicated between two points or while it is stored in a medium vulnerable to physical theft. Communication security provides protection of data by enciphering it at the transmitting point and deciphering it at the receiving point. The transmitting and the receiving points may be located within the same or different devices. The key must be available at the transmitter and receiver simultaneously during communication. The algorithms may be implemented in software, firmware, hardware, or any combination thereof. A cryptographic system includes a cryptographic engine, keying information, and operational procedures for their secure use. A cryptographic engine implements cryptographic functions.

Cryptographic systems may be utilized in various computer and telecommunication applications including data storage, access control and personal identification, network communications, radio, facsimile, e-mail and other electronic messaging systems, audio/video/voice transmission, etc. The cryptographic system 38 may be implemented in hardware, software, and/or firmware. The cryptographic system 38 performs security functions, including execution of cryptographic algorithms and key generation in support of the cryptographic algorithms. Key establishment may be performed using either electronic methods (a key loading device such as a smart card/token, PC card, or other electronic key loading device), manual methods (using a keyboard), or a combination of electronic and manual methods. Cryptographic keys can be stored in either plain text or encrypted form.

A cryptographic system can execute various cryptographic algorithms that alternatively encrypt or decrypt data. Encrypting data converts it to an unintelligible form called a cipher. Decrypting the cipher converts the data back to its original form called plain text. In general, decrypting the cipher involves an inverse of the algorithm used to encrypt the data. As examples, a cryptographic system can implement the data encryption standard (DES), the triple data encryption algorithm (TDEA), and/or the advanced encryption standard (AES). DES includes multiple mathematical algorithms for encrypting and decrypting binary coded information based on a binary number called a key. TDEA is a compound operation of DES encryption and decryption operations. A TDEA key consists of three DES keys. Data can be recovered from a cipher only by using exactly the same key used to encipher it. The National Security Agency (NSA) works in partnership with the National Institute of Standards and Technology (NIST) to maintain a set of cryptographic algorithms that are suitable to applications across a wide range of communicator needs. NSA defines cryptographic algorithms in 4 "types" according to the evaluated strength or origin of the algorithms. These types are:

Type 1—Certified by NSA for classified information protection

Type 2—Certified by NSA for Unclassified For Official Use Only (FOUO)

Type 3—Certified by NIST for general applications for unclassified information

Type 4—Algorithms produced by industry or other nations (no Government certification)

The programmable nature of the crypto engine should allow any level of algorithms to be implemented within the radio system and the cryptographic subsystem.

Military radio systems, such as the Joint Tactical Radio System (JTRS) (available from Rockwell Collins, Inc. of Cedar Rapids, Iowa) has employed the Software Communication Architecture (SCA) standard to make software as portable as possible between JTRS-compliant radio platforms. This approach has been proven to work well for general-purpose processors (GPPs). The same approach has been applied to modem resources of Floating Point Gate Arrays (FPGAs) and Digital Signal Processors (DSPs), where the concept of so-called modem hardware abstraction layer (MHAL) has been developed to "abstract away" the specific hardware constituents of a JTRS modem so that modem waveform software can be easily developed for any modem or ported from one modem to another.

A solution to the above is to develop a similar abstraction layer for cryptographic functions. Note that SCA already abstracts service calls via standard cryptographic subsystem definitions (function and interface). In accordance with an exemplary embodiment, a standard call may be used for the encryption function ("encrypt"). The SCA does not standardize calls for lower-level functions within such services, e.g. calls for "permute" and "vector dot product" are not defined.

In accordance with an exemplary embodiment, lower-level functions are made standard, regardless of the hardware that is used to implement a given cryptographic engine. To do this, one can employ the stack depicted in FIG. 2. Stack 200 (which is a portion of cryptographic system 38 of FIG. 1) comprises a Crypto Engine 210 which may be designed as different hardware platforms for different radio systems and different radio system vendors. In package 200, the Crypto Engine Abstraction Layer 220, the Core Crypto Algorithms layer 230, and the Crypto Equipment Software Layer 240 are embodied in a single integrated package. In accordance with an exemplary embodiment, the single integrated package may be broken down into its constituent components 220, 230, and 240. Crypto Engine Abstraction Layer 220 may be configured as a hardware component that is designed as unique to the specific radio system platform that it is to be used on whether it be a different model or hardware for a different vendor.

The core algorithms may be segregated into "Core Crypto Algorithms" layer 230. Cryptographic Engine Abstraction Layer (CEAL) 220 may be configured to translate to the specific hardware (Crypto Engine 210) being used. With some similarity to the MHAL, the CEAL may be a "cryptographic engine support package" for the cryptographic engine, much as board support packages (e.g. APIs, etc.) are often provided with commercial off-the-shelf (COTS) electronic cards to make them easy to program for a particular application. Stack 200 may be compatible with the SCA.

Figure 2:
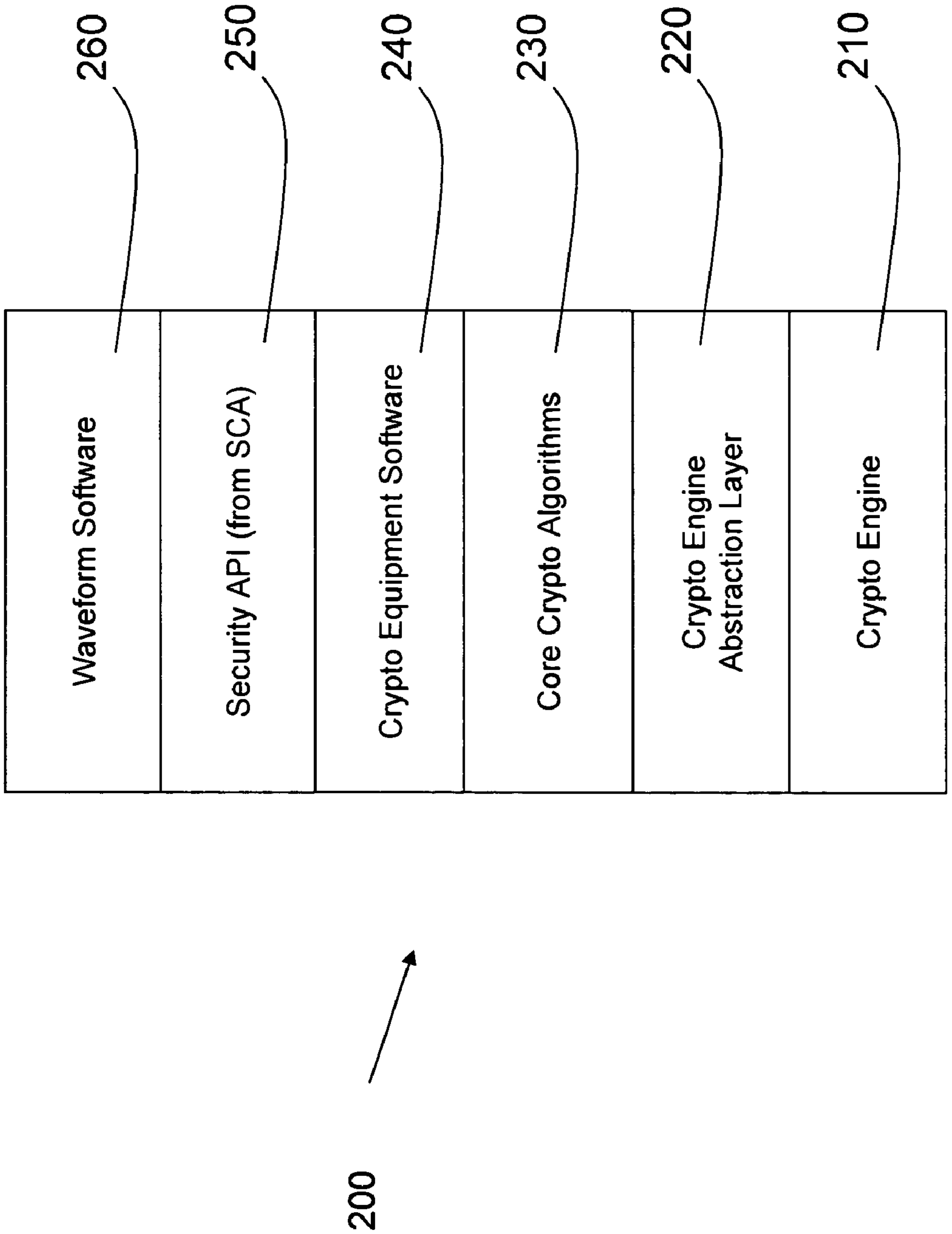
FIG. 2 is an exemplary diagram of a stack for the cryptographic engine support package.
Figure 3:
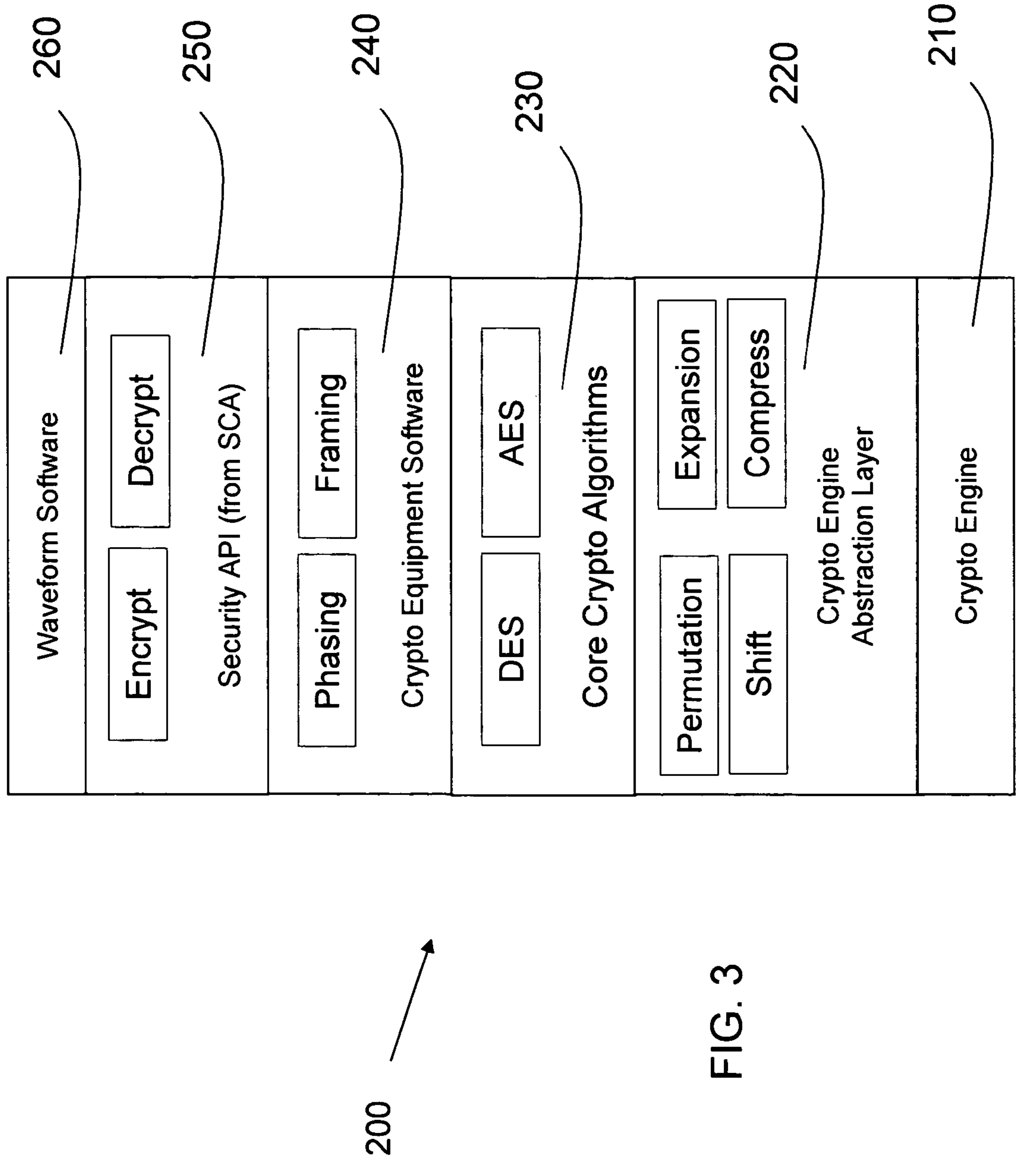
FIG. 3 is an exemplary diagram of the stack depicted in FIG. 2 for the cryptographic engine support package.

Referring now to FIG. 3, additional detail regarding the stack layers depicted in FIG. 2 is provided. Security API 250 is focused solely on providing cryptographic services to waveform software 260. Example cryptographic services are Encrypt and Decrypt function calls. The crypto equipment software 240 is focused on providing messages preambles and message header services. Example message preamble functions are phasing and framing patterns to detect cipher text signal and acquire clock synchronization. The core crypto algorithm layer 230 is focused on implementation of the required crypto algorithm (e.g., DES, AES, Type 1, etc.), using the services provided by the crypto engine abstraction layer 220. Crypto engine abstraction layer 220 provides the basic computations necessary for implementing a crypto algorithm. Example computations required to implement an algorithm are permutation, expansion, shift and compress.

The decoupling of the cryptographic engine and its cryptographic engine abstraction layer enables the writing of new algorithms and/or porting them to new platforms/engines to be more straightforward. The problem of international customers wishing to implement their own software algorithms on these complex engines may be solved by the aforementioned architecture. Further, the life-cycle cost for other customers porting their software from one system to another may be made more affordable.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A radio system, comprising:

radio frequency receiving electronics;

digital signal processing electronics coupled to the radio frequency receiving electronics; and security electronics coupled to the digital signal processing electronics, the security electronics comprising a cryptographic subsystem, the cryptographic subsystem comprising a core cryptographic algorithms layer and a cryptographic engine abstraction layer stacked with but separate from one another, the cryptographic engine abstraction layer translating lower level functions from the core cryptographic algorithms layer for execution on a specific cryptographic engine design, the lower level functions being non-specific to the specific cryptographic engine design.

2. The radio system of claim 1, further comprising:

a cryptographic engine being interfaced with the cryptographic engine abstraction layer hardware.

3. The radio system of claim 1, further comprising:

a security application programming interface stacked with the cryptographic equipment software.

4. The radio system of claim 3, further comprising:

waveform software stacked with the security application programming interface.

5. The radio system of claim 1, wherein the cryptographic equipment software may be used on a different radio platform using a different cryptographic engine abstraction layer.

6. The radio system of claim 1, wherein the core cryptographic algorithms implement a triple data encryption algorithm (TDEA).

7. The radio system of claim 1, wherein the core cryptographic algorithms implement at least one of a data encryption standard (DES) and an advanced encryption standard (AES).

8. The radio system of claim 5, wherein the core cryptographic algorithms implement at least one of a data encryption standard (DES) or an advanced encryption standard (AES).

9. A method of providing radio communications comprising:

providing radio frequency communications to radio frequency receiving electronics;

processing a received signal by digital signal processing electronics coupled to the radio frequency receiving electronics; and decrypting received signals by using security electronics coupled to the digital signal processing electronics, the security electronics comprising a cryptographic subsystem, the cryptographic subsystem comprising a core cryptographic algorithms layer and a cryptographic engine abstraction layer stacked with but separate from one another, the cryptographic engine abstraction layer translating lower level functions from the core cryptographic algorithms layer for execution on a cryptographic engine, the lower level functions being non-specific to the cryptographic engine.

10. The method of claim 1, further comprising:

interfacing a cryptographic engine with the cryptographic engine abstraction layer hardware.

11. The method of claim 1, further comprising:

providing a security application programming interface stacked with the cryptographic equipment software.

12. The method of claim 11, further comprising:

providing waveform software stacked with the security application programming interface.

13. The method of claim 12, wherein the cryptographic equipment software may be used on a different radio platform using a different cryptographic engine abstraction layer.

14. The method of claim 9, wherein the core cryptographic algorithms implement a triple data encryption algorithm (TDEA).

15. The method of claim 9, wherein the core cryptographic algorithms implement a data encryption standard (DES).

16. The radio system of claim 9, wherein the core cryptographic algorithms implement an advanced encryption standard (AES).

17. An apparatus for providing radio communications comprising:

a means for providing radio frequency communications to radio frequency receiving electronics;

a means for processing a received signal by digital signal processing electronics coupled to the radio frequency receiving electronics; and a means for decrypting received signals by using security electronics coupled to the digital signal processing electronics, the security electronics comprising a cryptographic subsystem, the cryptographic subsystem comprising a core cryptographic algorithms layer and a cryptographic engine abstraction layer stacked with but separate from one another, the cryptographic engine abstraction layer translating lower level functions from the core cryptographic algorithms layer for execution by the cryptographic engine.

18. The apparatus of claim 17, wherein the core cryptographic algorithms implement a triple data encryption algorithm (TDEA).

19. The apparatus of claim 17, wherein the core cryptographic algorithms implement a data encryption standard (DES).

20. The apparatus of claim 17, wherein the core cryptographic algorithms implement an advanced encryption standard (AES).

* * * * *